United States Patent [19]
Marcus

[11] Patent Number: 5,138,586
[45] Date of Patent: Aug. 11, 1992

[54] ACOUSTIC LOGIC CIRCUITS

[75] Inventor: Michael A. Marcus, Honeoye Falls, N.Y.

[73] Assignee: Eastman Kodak Company, Rochester, N.Y.

[21] Appl. No.: 706,915

[22] Filed: May 29, 1991

[51] Int. Cl.$^5$ .............................................. G01S 15/00
[52] U.S. Cl. ....................... 367/96; 367/903; 367/87
[58] Field of Search .................... 367/96, 903, 87

[56] References Cited

U.S. PATENT DOCUMENTS

| | | | |
|---|---|---|---|
| 3,665,211 | 5/1972 | Owens et al. | 307/117 |
| 3,694,800 | 9/1972 | Frank | 340/1 R |
| 4,494,841 | 1/1985 | Marcus | 354/21 |
| 4,850,232 | 7/1989 | Markis | 73/865.8 |

*Primary Examiner*—Daniel T. Pihulic
*Attorney, Agent, or Firm*—Hodgson, Russ, Andrews, Woods & Goodyear

[57] ABSTRACT

An acoustic sensor functioning as a digital logic device comprises a resonant chamber, at least one port establishing a first resonant frequency therein when the port is closed and establishing a second resonant frequency therein when the port is open, a transmitter in communication with the chamber and tuned to either of the first or second resonant frequencies and a receiver in communication with the chamber for providing a digital logic output. When the port is closed or open and when the transmitter is tuned to the second or first resonant frequencies, respectively, the device functions as an inverter.

In another form an acoustic logic device comprises a resonant chamber, at least two ports establishing a plurality of resonant frequencies therein depending upon whether the ports are all open, all closed or some open and the rest closed, a receiver in communication with the chamber for providing a digital logic output, and a transmitter in communication with the chamber and tuned to one of the resonant frequencies. When the device includes two ports and the transmitter is tuned to the resonant frequency corresponding to both of the ports being closed, or both of the ports being open or one of the ports being open and the other port being closed, the device functions as an AND gate or a NOR gate or an EXCLUSIVE OR gate, respectively. Also provided are acoustic logic devices having three or more ports.

21 Claims, 5 Drawing Sheets

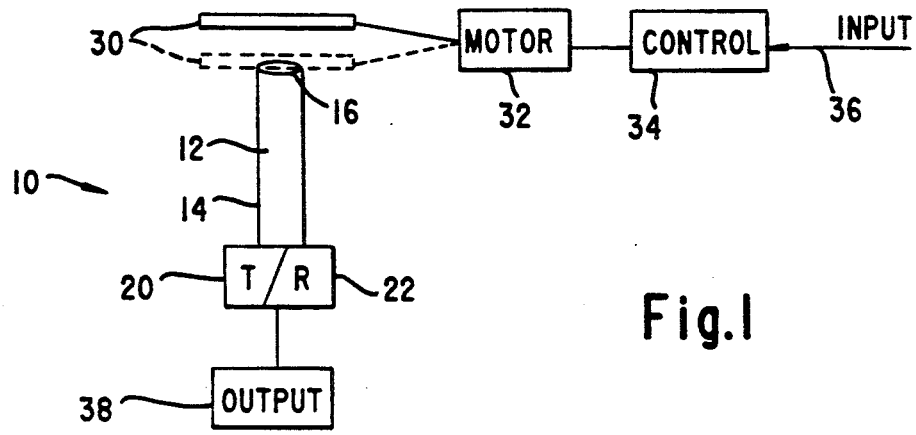
Fig.1
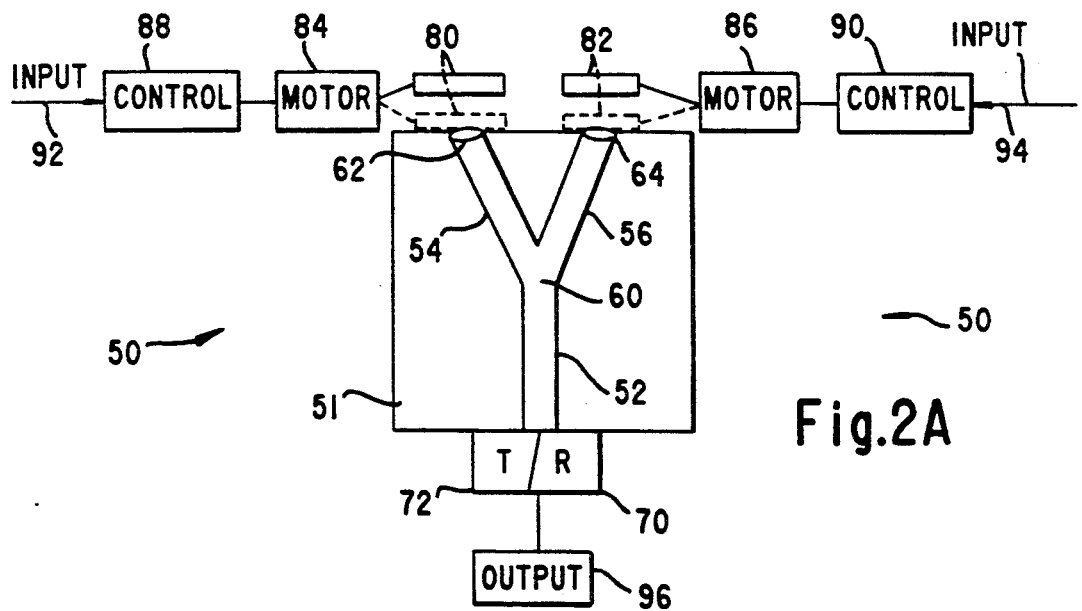
Fig.2A
Fig.2B
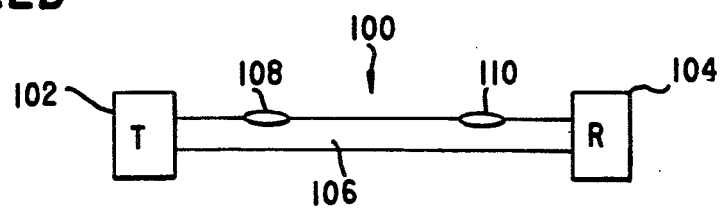

ACOUSTIC LOGIC CIRCUITS

BACKGROUND OF THE INVENTION

This invention relates to the art of logic devices, and more particularly to a new and improved logic device employing acoustic means.

Electronic logic devices such as inverters and AND, NAND, OR and NOR gates employ high and low voltage levels to indicate the digital logic 0 and 1 states. Thus two distinct amplitudes or levels of an electrical parameter are used to indicate the two logic states.

Acoustic transducers or gauges exist in which an acoustic parameter has two distinct levels, and an example is shown and described in U.S. Pat. No. 3,694,800, issued Sep. 26, 1972 entitled "Acoustical Gauge" and assigned to the assignee of the present invention. Briefly, the transducer of that patent employs the physical principle that the resonant frequency of an acoustic resonator having a port changes as a function of the obstruction of the port. A tube is provided for defining an acoustic resonator. An acoustic signal generating transducer is connected to the tube for generating an acoustic signal of predetermined frequency in the acoustic resonator. An opening is provided in the tube to define a port, and the resonant frequency of the acoustic resonator varies as a function of the position of an object near the port. An acoustic signal sensing transducer also is connected to the tube and produces a signal representing the resonant condition in the acoustic resonator. Depending upon the size of the resonator, the size of the port and the frequency of the acoustic signal generator the device can be tuned for open tube resonance or closed tube resonance. When it is tuned to a closed tube resonance the signal produced by the sensing transducer will be a maximum when the port is closed and a minimum when the port is open. Thus in response to two states of the port, i.e. open or closed, the device produces two signal states, i.e. maximum or minimum.

It would, therefore, be highly desirable to provide a digital logic device which utilizes the two state operation of acoustic sensing devices. In this connection it would be desirable to provide such an acoustic device capable of implementing a variety of logic devices such as inverters and AND, NAND, OR and NOR gates.

SUMMARY OF THE INVENTION

It is, therefore, a primary object of this invention to provide a new and improved logic device employing acoustic means.

It is a more particular object of this invention to provide a digital logic device which utilizes the two state operation of acoustic sensing devices.

It is a further object of this invention to provide acoustic logic circuit elements which are capable of being implemented to perform a variety of digital logic functions including NOT, AND, NAND, OR, NOR and Exclusive OR (XOR).

It is a more particular object of this invention to provide acoustic logic devices which are relatively simple in structure and efficient and effective in operation.

The present invention provides an acoustic sensor adapted to function as a digital logic device. In one aspect thereof, there is provided an acoustic logic device comprising a resonant chamber, at least one port establishing a first resonant frequency in the chamber when the port is closed and establishing a second resonant frequency in the chamber when the port is open, transmitter means operatively associated with the chamber and tuned to either of the first or second resonant frequencies and receiver means operatively associated with the chamber and responsive to acoustic signals developed therein. When the port is closed or open and when the transmitter means is tuned to the second or first resonant frequencies, respectively, the device functions as an inverter.

In another aspect of the present invention there is provided an acoustic logic device comprising a resonant chamber, at least two ports establishing a plurality of resonant frequencies in the chamber depending upon whether the ports are all open, all closed or some open and the rest closed, receiver means operatively associated with the chamber and responsive to acoustic signals developed therein, and transmitter means operatively associated with the chamber and tuned to one of the resonant frequencies thereby determining the type of logic device. When the device includes two ports and the transmitter is tuned to the resonant frequency corresponding to both of the ports being closed, or both of the ports being open or one of the ports being open and the other port being closed, the device functions as an AND gate or a NOR gate or an EXCLUSIVE OR gate, respectively. The present invention also includes within its scope acoustic logic devices having three or more ports.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a diagrammatic view of a single input acoustic logic device according to the present invention;

FIG. 2A and 2B are diagrammatic views of alternative forms of a two input acoustic logic device according to the present invention;

DETAILED DESCRIPTION OF THE ILLUSTRATED EMBODIMENTS

Figure 3:
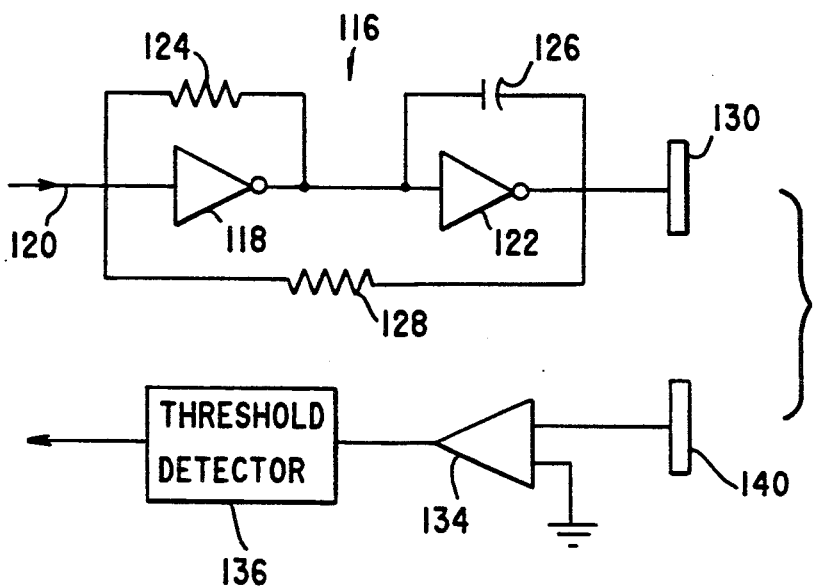
FIG. 3 is a schematic diagram of a driving/detection circuit for the devices of FIGS. 2A and 2B.

Referring to FIG. 1 there is shown an acoustic logic device 10 according to the present invention which functions as an inverter. The logic device 10 comprises a resonant chamber 12 which in the present illustration is defined by the interior of a tube 14. Alternatively, resonant chamber 12 can comprise a cylindrical passage in a solid body or block of suitable material. Device 10 further comprises a single port 16 in communication with resonant chamber 12 and which is defined by the normally open end of the tube 14. Port 16 establishes a first resonant frequency in chamber 12 when the port is closed and establishes a second resonant frequency in chamber 12 when the port is open.

The acoustic logic device 10 according to the present invention further comprises transmitter means 20 operatively associated with resonant chamber 12 and tuned to either of the above-mentioned first or second resonant frequencies and receiver means 22 operatively associated with chamber 12 and responsive to acoustic signals developed therein. In the device shown the transducer comprises transmitter 20 and receiver 22 in a single pipe configuration which will be described in further detail presently. Alternatively the device can comprise separated transducers in a transmission configuration which also will be described presently.

The acoustic logic device 10 according to the present invention operates in the following manner. Assume that transmitter means 20 is tuned to the second resonant frequency mentioned above which corresponds to port 16 being open. Accordingly, when port 16 is closed the output signal provided by receiver 22 will be below an electrically set threshold level, and when port 16 is opened the receiver output will be above the threshold level. Thus, if a closed port is assigned a logical 1 state and an open port is assigned a logical 0 state, the device 10 functions as a logical inverter which is summarized by the following truth table:

| State Of Port 16 | Logical State Of Receiver Output |
| --- | --- |
| Closed(Logical 1) | 0 |
| Open(Logical 0) | 1 | where the minimum or low receiver output corresponds to a logical 0 and the maximum or high receiver output corresponds to a logical 1.

Alternatively, assuming that transmitter means 20 is tuned to the first resonant frequency mentioned above which corresponds to port 16 being closed, when port 16 is open the output signal provided by receiver 22 will be below an electrically set threshold level and when port 16 is closed the receiver output will be above the threshold level. Thus, if an open port is assigned a logical 1 state and a closed port is assigned a logical 0 state, the device 10 again functions on a logical inverter which is summarized by the following truth table:

| State Of Port 16 | Logical State Of Receiver Output |
| --- | --- |
| Open(Logical 1) | 0 |
| Closed(Logical 0) | 1 |

The open and closed states of port 16 in the present example are provided by a closure member 30, shown in solid lines in FIG. 1 in the port open position and shown in dotted lines in the port closed position. Closure member 30 is moved between these two positions by suitable motive means 32, such as an electric or fluid motor, under control of a control means 34 responsive to an information, command or control signal 36 from the operating environment of which the acoustic logic device 10 is a part. Similarly, the logical output signal from receiver 22 is applied to the input of suitable means 38 in that same operating environment for utilizing the logical information in the receiver output signal.

The acoustic inverter 10 of the present invention can be used as a switch to determine if an object is located directly above the port or not. This can find utility as limit switches in positioning of devices. In addition, the acoustic inverter 10 can be used as an on-off switch.

Referring now to FIGS. 2A and 2B there is shown alternative forms of a two input acoustic logic device according to the present invention for implementing various logic devices such as AND and NOR gates. In FIG. 2A, the logic device 50 comprises a Y-shaped configuration typically provided by passages defined in a block or body 51 of suitable material. In particular, device 50 comprises a first or main passage 52 of cylindrical cross-section which meets at one end and a pair of symmetrical diverging branch passages 54 and 56 each of cylindrical cross-section. A resonant chamber 60 is defined by the interior regions of the passages 52,54 and 56. Device 50 further comprises a pair of ports in communication with resonant chamber 60, the first port 62 being defined by the normally open end of passage 54 and the second port 64 being defined by the normally open end of passage 56. The two ports 62 and 64 establish a plurality of resonant frequencies in chamber 60 depending upon whether both the ports are open, both the ports are closed or one of the ports is open and the other is closed.

The acoustic logic device 50 according to the present invention further comprises receiver means 70 operatively associated with resonant chamber 60 and responsive to acoustic signals developed therein. Device 50 also comprises transmitter means 72 operatively associated with resonant chamber 60 and tuned to one of the above-mentioned resonant frequencies thereby determining the type of logic device implemented by device 50 in a manner which will be described. The transducer of FIG. 2A includes transmitter 72 and receiver 70 in a single pipe configuration.

The acoustic logic device 50 according to the present invention operates in the following manner. First, assume that transmitter means 72 is tuned to the resonant frequency corresponding to both of the ports 62,64 being closed. Accordingly, when both of the ports 62,64 are closed the output signal provided by receiver 70 will be above an electrically set threshold level. However, when either or both of the ports 62,64 are open the output signal provided by receiver 70 will be below the threshold level. Thus, if a closed port is assigned a logical 1 state and an open port is assigned a logical 0 state, the device 50 functions as a logical AND gate which is summarized by the following truth table:

| State Of Port 62 | State Of port 64 | Logical State Of Receiver Output |
|---|---|---|
| Closed(logical 1) | Closed(logical 1) | 1 |
| Open(logical 0) | Closed(logical 1) | 0 |
| Closed(logical 1) | Open(logical 0) | 0 |
| Open(logical 0) | Open(logical 0) | 0 | where the receiver output below threshold corresponds to a logical 0 and the receiver output above threshold corresponds to a logical 1.

Next, assume that transmitter means 72 is tuned to the resonant frequency corresponding to both of the ports 62,64 being open. Accordingly, when both of the ports 62,64 are closed the output signal provided by receiver 70 will be below an electrically set threshold level. Similarly, when either of the ports 62,64 are closed the output of receiver 70 will be below the threshold. However, when both of the ports 62,64 are open the output signal provided by receiver 70 will be above the threshold level. Thus, if a closed port is assigned a logical 1 state and an open port is assigned a logical 0 state, the device 50 functions as a logical NOR gate which is summarized by the following truth table:

| State Of Port 62 | State Of Port 64 | Logical State Of Receiver Output |
|---|---|---|
| Closed(logical 1) | Closed(logical 1) | 0 |
| Open(logical 0) | Closed(logical 1) | 0 |
| Closed(logical 1) | Open(logical 0) | 0 |
| Open(logical 0) | Open(logical 0) | 1 | where the receiver output below threshold corresponds to a logical 0 and the receiver output above threshold corresponds to a logical 1. The acoustic logic device 50 can be used to sense the presence of an object covering any one or more of the ports 62,64. Also, in the case of using the resonance frequency for one port open and one port closed in a symmetrical port configuration, the device 50 can be used as an EXCLUSIVE OR gate.

The open and closed states of ports 62 and 64 in the present example are provided by closure members 80 and 82, respectively, shown in solid lines in FIG. 2A in the port open position and shown in dotted lines in the port closed position. Closure members 80 and 82 are moved between these two positions by suitable motive means 84 and 86, respectively, such as electric or fluid motors, under control of control means 88 and 90, respectively, in response to information, command or control signals, 92 and 94, respectively from the operating environment of which the acoustic logic device 50 is a part. Similarly, the logical output signal from receiver 70 is applied to the input of suitable means 96 in that same operating environment for utilizing the logical information in the receiver output signal. Alternative arrangements can of course be employed, such as a single control means for operating both motors in response to the two input signals.

As an alternative to the transmitter and receiver being in a single pipe configuration, FIG. 2B shows an acoustic logic device 100 wherein the transmitter 102 and receiver 104 are located in spaced relation along a resonant chamber 106 as separated transducers in a transmission configuration. Acoustic logic device 100 is interchangeable with device 50 and functions as a logical AND gate or NOR gate in a manner identical to that described in connection with FIG. 2A. As in the arrangement for device 50, resonant chamber 106 can be defined by a cylindrical passage or bore in a block or body of suitable material or, alternatively, it can be provided by a tubular structure. The ports 108,110 are opened and closed by an arrangement (not shown) of closure member, motors and controls identical to that shown in FIG. 2A. The acoustic logic device 100 shown in FIG. 2B can be used to sense the presence of an object covering any one or more of the ports 108,110 in a manner like the device 50 of FIG. 2A.

FIG. 3 illustrates a form of driving/detecting circuit which can be employed with either the combined transmitter 20, receiver 22 arrangement of FIG. 2A or separated transmitter 102 and receiver 104 in the arrangement of FIG. 2B. The driving circuit comprises an oscillator 116 comprising a first inverter 118 having an input 120 connected to a suitable input signal source (not shown) and a second inverter 122. A feedback resistor 124 is connected across inverter 118 and a feedback capacitor 126 is connected across inverter 122. A feedback resistor is connected from the output of inverter 122 to the input of inverter 118. The output of inverter 122, which is the oscillator output is connected to an acoustic transmitting transducer element 130 which can be a piezoelectric polymer or ceramic transducer element which will be described in detail presently. The illustrative oscillator 116 shown in the example of FIG. 3 is a 4049 hex inverter in a feedback oscillator mode. The oscillator circuit may be any of a variety of standard integrated circuit oscillator chips. The receiving circuit comprises the combination of an FET operational amplifier 134 and a threshold detector 136. One input of amplifier 134 is connected to an acoustic receiving transducer element 140 which can be a piezoelectric polymer or ceramic film which will be described in detail presently. The output of threshold detector 136 is connected to the utilization means, for example that designated 96 in FIG. 2A. For enabling the acoustic circuit elements to implement logical functions the threshold level is electrically set to distinguish between the logical zero and one states.

Figure 4:
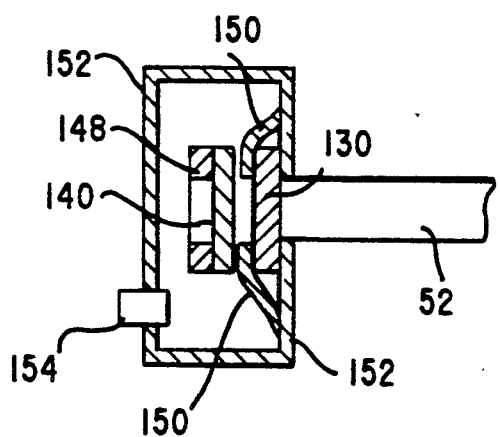
FIG. 4 is a diagrammatic view of a form of transmitting/receiving means for the device of FIG. 2A.

FIG. 4 shows one form of transmitting/receiving transducer means comprising a single pipe acoustic transducer configuration usable in the acoustic logic device 50 of FIG. 2A. The two transducers 130 and 140 comprising two polyvinylidene fluoride (PVF$_2$) elements are layered adjacent each other at the one end of passage 52. In particular, transmitting transducer 130 is in the form of a disc held in place by mounting ring 146 and receiving transducer 140 also is in the form of a disc held in place by a mounting ring 148. The discs are separated by a shield 150 of metal or like conductive material which serves as a ground plane between the two transducers 130,140 for RFI shielding. The transducers are located within a conductive housing 152 which provides additional shielding for receiving transducer 140 to eliminate unwanted noise sources. Electrical leads (not shown in FIG. 4) from transducers 130,140 are connected to a terminal structure 154 insulated from housing 152 for making electrical connection to the transducer driving and detecting circuitry, for example that shown in FIG. 3.

Polyvinylidene fluoride (PVF$_2$), a polymer which exhibits piezoelectric and pyroelectric properties when appropriately polarized, is preferred as the transmitter T and receiver R material. However, the transmitter T and receiver R can be ceramic piezoelectric transducers as well. In fact, depending upon the application, transmitter T can be any suitable acoustic generator and receiver R can be any suitable acoustic receiver.

Miniature $PVF_2$ acoustic transducers which are coupled to miniature pipes, such as transducers 130,140 coupled to passage 52, utilize both the direct and converse piezoelectric effects. A $PVF_2$ transmitter (electromechanical converter) like disc 130 sends acoustic energy down a pipe like passage 52. Acoustic energy is either transmitted through a pipe orifice i.e. openings 62,64, or reflected to a second $PVF_2$ transducer used as a receiver of acoustic energy (mechano-electric converter) like disc 140. Changing the state of the orifice such as closing the hole or moving an object near it changes the amplitude and/or phase of the electrical signal produced by the receiving transducer. When the electrical drive frequency is adjusted to a mechanical pipe resonance, large increases in sensitivity occur. This is due to the fact that if a pipe is tuned for an open resonance closing the port will frustrate the resonance and destroy the standing wave. Similarly, if the pipe is tuned for a closed resonance opening the port will destroy the standing wave, thus decreasing the acoustic energy incident upon the receiver.

For more information on the general operation of acoustic transducer arrangements, reference may be made to U.S. Pat. No. 3,694,800 issued Sep. 26, 1972 entitled "Acoustical Gauge" and assigned to the assignee of the present invention. For more information on the structure and operation of a transmitting and receiving pair like that shown in FIG. 4, reference may be made to U.S. Pat. No. 4,494,841 issued Jan. 22, 1985 entitled "Acoustic Transducers For Acoustic Position Sensing Apparatus" and assigned to the assignee of the present invention. The disclosures of both of these references are hereby incorporated by reference.

Figure 5:
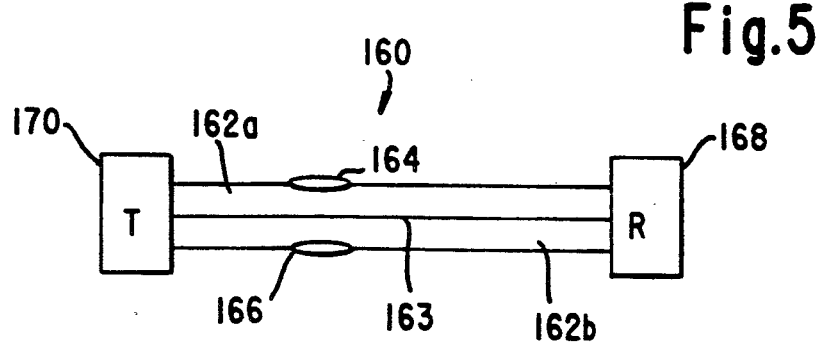
FIG. 5 is a diagrammatic view of an acoustic logic device according to another embodiment of the present invention.

FIG. 5 illustrates an acoustic logic device 160 according to another embodiment of the present invention for implementing an EXCLUSIVE OR logic device. In particular, device 160 comprises a resonant chamber 162 having two portions 162a,162b in adjacent side-by-side relation so as to have substantially parallel longitudinal axes and having common or coaxial ends. The chamber portions 162a,162b could comprise separate longitudinal bores or passages in a block or body of suitable material, adjacent halves of a single conduit or single longitudinal bore or passage separated by a central divider, or adjacent tubular conduits. A gap or passage 163 allows acoustic communication between the two chamber portions 162a,162b. Device 160 further comprises a pair of ports in communication with resonant chamber 162, the first port 164 being provided by an opening in chamber portion 162a and located between the ends thereof and the second port 166 being provided by an opening in chamber 162b and located between the ends thereof. In the illustrative device shown, the ports 164,166 are in substantial axial alignment. The two ports 164,166 establish various resonant frequencies in chamber 162, and in the device 160 of this embodiment the resonant frequency corresponds to one of the ports being open and the other of the ports being closed.

The acoustic logic device 160 further comprises receiver means 168 operatively associated with resonant chamber 162, i.e. with both portions 162a,162b, and responsive to acoustic signals developed therein. Device 160 further comprises transmitter means 170 operatively associated with resonant chamber 162, i.e. with both portions 162a,162b, and tuned to the above-mentioned resonant frequency corresponding to one port being open and the other closed as will be described. The transducer of FIG. 5 includes transmitter 170 and receiver 168 at opposite ends of resonant chamber 162 and thus as separated transducers in a transmission configuration similar to that illustrated in FIG. 2B.

The acoustic logic device 160 according to this embodiment of the present invention operates in the following manner. Assume that transmitter means 170 is tuned to the resonant frequency corresponding to one of the ports 164,166 being open and the other closed. Accordingly, when port 164 is open and port 166 closed or when port 164 is closed and port 166 open, the output signal provided by receiver 168 will be above the electrically set threshold level. However, when ports 164 and 166 are both open or both closed, the output signal provided by receiver 168 will below the threshold. Thus, if a closed port is assigned a logical 1 state and an open port is assigned a logical zero state, the device 160 functions as a logical EXCLUSIVE OR gate which is summarized by the following truth table:

| State Of Port 164 | State Of Port 166 | Logical State Of Receiver Output |
|---|---|---|
| Closed(logical 1) | Closed(logical 1) | 0 |
| Open(logical 0) | Closed(logical 1) | 1 |
| Closed(logical 1) | Open(logical 0) | 1 |
| Open(logical 0) | Open(logical 0) | 0 | wherein the receiver output below threshold corresponds to a logical 0 and the receiver output above threshold corresponds to a logical 1.

The ports 164,166 are opened and closed by an arrangement (not shown) of closure members, motors and controls identical to that shown in FIG. 2A. The transducers of receiver 168 and transmitter 170 can be connected to a driving/detecting circuit like that shown in FIG. 3.

The acoustic logic device 160 having the geometry shown in FIG. 5 could also function as an AND gate by having transmitter 170 tuned to the resonant frequency corresponding to both of the ports 164,166 being closed. Thus, if a closed port is assigned a logical one state and an open port is assigned a logical zero state as in the foregoing truth table, when both ports 164,166 are closed the receiver output is a logical one and when either or both of ports 164,166 is open the receiver output is a logical zero. As an example, such an arrangement would be useful as a sensor 160' in a lamination process illustrated in FIG. 6.

Figure 6:
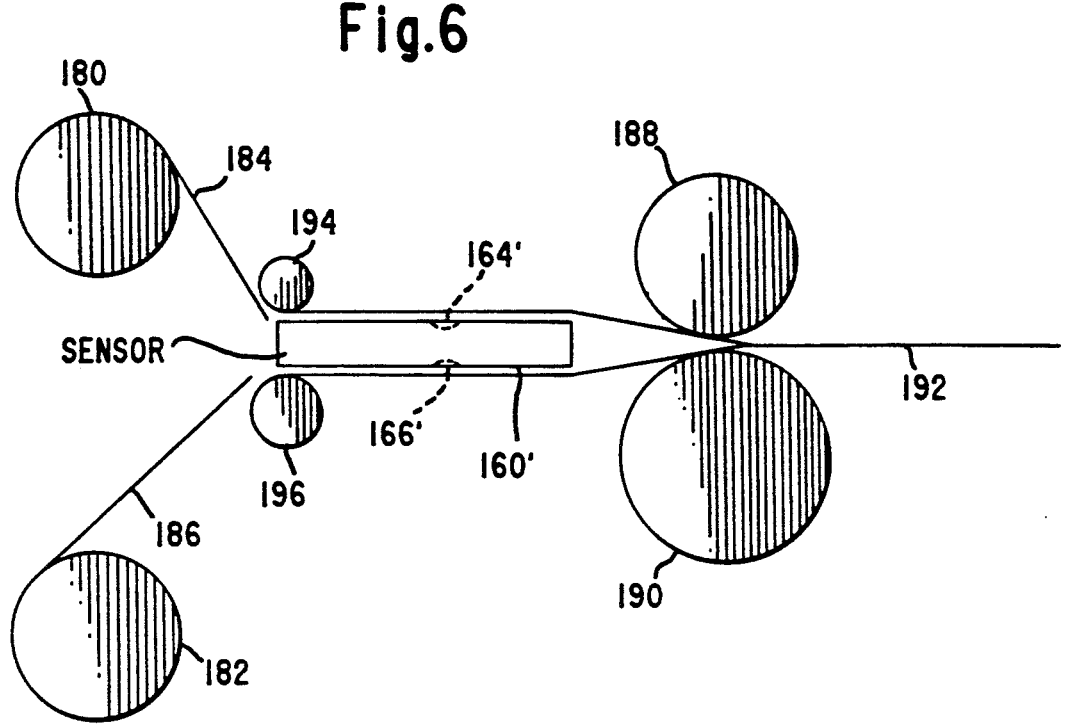
FIG. 6 is a diagrammatic view of an acoustic logic device according to the present invention employed in a lamination sensor.

In particular, FIG. 6 illustrates diagrammatically two feed rolls 180 and 182 containing film webs 184 and 186, respectively which are to be laminated. Sensor 160' is located upstream from the lamination nip comprising rollers 188,190 which combine the separate webs 184,186 into a composite laminate structure 192 exiting from rollers 188,190. The sensor ports 164' and 166' are located so as to be closed by the film webs 184 and 186, respectively, travelling across the opposite surfaces of sensor 160' as they move toward the lamination nip. Sensor 160' employs AND gate logic to determine if both film webs 184 and 186 from rolls 180 and 182, respectively, are present. In particular, if both webs 184 and 186 are located in proximity to the sensing ports 164' and 166' then both ports are closed by the presence of the webs. This, in turn, provides a feedback signal to the lamination system for process control. Pinch rollers 194,196 can be provided at the forward or input region of sensor 160' to ensure closure of the sensor ports when the film webs are present.

In addition to the examples of logic AND, NOR and EXCLUSIVE OR gates specifically disclosed, the acoustic logic device of the present invention can be used to implement other types of logic gates. For example, in the two port form of the device, when the transmitting means is tuned to the resonant frequency of the resonant chamber corresponding to one of the ports being closed and the other port being open, and to the resonant frequency of the resonant chamber corresponding to both ports being closed, the acoustic logic device of the present invention can implement a logical OR gate. This mode of operation involves the super position of two input frequencies. Accordingly, when either of the ports is closed and the other port open or when both ports are closed, the output signal provided by the receiver will exceed the electrically set threshold level. However, when both of the ports are open, the receiver output will be below the threshold. Thus, if a closed port is assigned a logical 1 state and an open port is assigned a logical 0 state, the device functions as an OR gate which is summarized by the following truth table:

| State Of One Port | State Of Other Port | Logical State Of Receiver Output |
|---|---|---|
| Closed(logical 1) | Closed(logical 1) | 1 |
| Open(logical 0) | Closed(logical 1) | 1 |
| Closed(logical 1) | Open(logical 0) | 1 |
| Open(logical 0) | Open(logical 0) | 0 | wherein the receiver output above threshold corresponds to a logical 1 and the receiver output below threshold corresponds to a logical 0.

By way of further example, again in the two port form of the device, when the transmitting means is tuned to the resonant frequency of the resonant chamber corresponding to one of the ports being closed and the other port being open, and to the resonant frequency of the resonant chamber corresponding to both ports being open, the acoustic logic device of the present invention can implement a logical NAND gate. This mode of operation involves the use of two superimposed input frequencies. Accordingly, when either of the ports is closed and the other port open or when both ports are open, the output signal provided by the receiver will exceed the electrically set threshold level. However, when both of the ports are closed, the receiver output will be below the threshold. Thus, if a closed port is assigned a logical 1 state and an open port is assigned a logical 0 state, the device functions as a NAND gate which is summarized by the following truth table:

| State Of One Port | State Of Other Port | Logical State Of Receiver Output |
|---|---|---|
| Closed(logical 1) | Closed(logical 1) | 0 |
| Open(logical 1) | Closed(logical 1) | 1 |
| Closed(logical 1) | Open(logical 0) | 1 |
| Open(logical 0) | Open(logical 0) | 1 | where the receiver output above threshold corresponds to a logical 1 and the receiver output below threshold corresponds to a logical 0.

Figure 7:
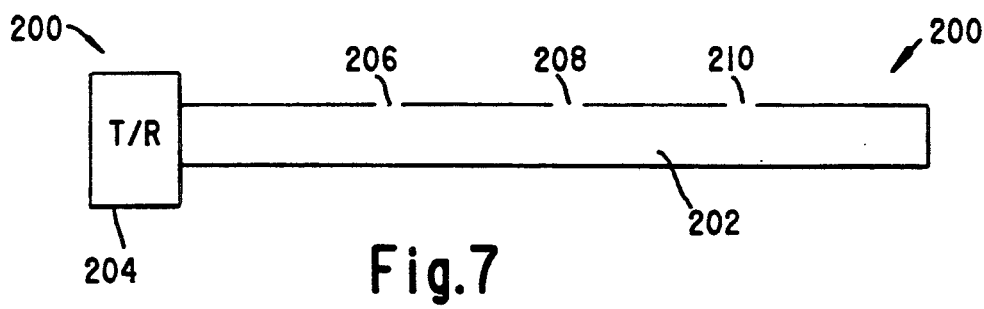
FIG. 7 is a diagrammatic view of a three port acoustic logic device according to the present invention which functions as an AND gate.

The present invention includes within its scope acoustic logic devices having three or more ports. Referring to FIG. 7 there is shown diagrammatically an acoustic logic device 200 including a resonant chamber 202 closed at one end and provided with a transmitter-receiver pair 204 at the other end in a single pipe configuration. Alternatively, the transmitter and receiver can be located in spaced relation at opposite ends of chamber 202 as separated transducers in a transmission configuration. As in the embodiments previously described, resonant chamber 202 can be defined by a cylindinal bore or passage in a block or body of suitable material or, alternatively, it can be provided by a tubular structure. Three ports 206, 208 and 210 are provided in spared relation along the length of chamber 202.

The acoustic logic device 200 operates in the following manner. The transmitter of pair 204 is tuned to the resonant frequency corresponding to all three ports 206, 208 and 210 being closed. Accordingly when all three ports are closed the output signal provided by the receiver of pair 204 will exceed an electrically set threshold level. However, when any or all of the three ports are open the output signal provided by the receiver will be below the threshold. Thus, the device 200 functions as a logical AND gate. While the acoustic logic device 200 has been illustrated in a form including three ports, it can be in a form including a greater number of ports, in which case it simply is tuned to all of the ports being closed.

Figure 8:
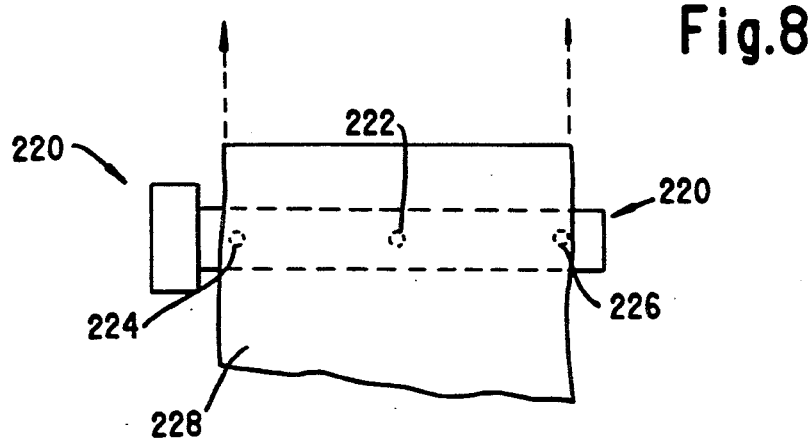
FIG. 8 is a diagrammatic view of a web drift sensor utilizing the device of FIG. 7.

One exemplary use of the foregoing three port acoustic logic device is in sensing lateral drift of a web of known width as it travels along a path. Device 220 shown in FIG. 8 is similar to device 200 of FIG. 7 and can be in the single pipe or transmission configuration as previously explained. Device 220 includes a central port 222 and two outboard ports 224, 226. A web 228 of known width and of material such as paper or plastic film is travelling along a path designated 230. When the web 228 is present the central port 222 is closed and when the web is properly located in a lateral direction, both outboard ports 224, 226 are closed. Accordingly, all three ports are closed and acoustic logic device 220 functioning as an AND gate signals a logical one. On the other hand, in the event that web 228 were to drift to the left as viewed in FIG. 8 port 226 would be open, or if web 228 drifted to the right port 224 would be open. In either event, device 220 would signal a logical zero indicating lateral drift of web 228. In an actual installation, the tolerance in degree of lateral web drift would be utilized in determining the diameter of ports 224, 226 and the lateral spacing therebetween is determined by the known width of web 228.

Figure 9:
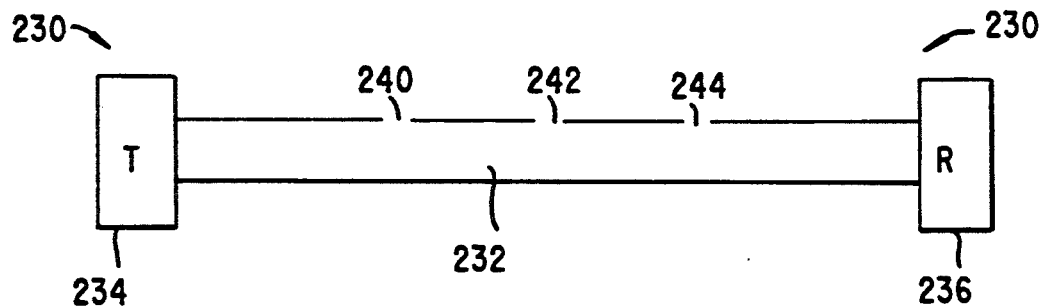
FIG. 9 is a diagrammatic view of a three port acoustic logic device according to the present invention which functions as a NOR gate.

FIG. 9 illustrates an acoustic logic device 230 according to the present invention which includes three ports and functions as a NOR gate. In particular, device 230 includes a resonant chamber 232 having transmitting transducer means 234 at one end and receiving transducer means 236 at the opposite end in a transmission configuration. Alternatively, the transmitter and receiver can be located at one end of chamber 232 with the opposite end being closed in a single pipe configuration. As in the embodiments previously described, resonant chamber 232 can be defined by a cylindical bore or passage in a block or body of suitable material or, alternatively, it can be provided by a tubular structure.

Three ports 240, 242 and 244 are provided in spaced relation along the length of chamber 232.

The acoustic logic device 230 operates in the following manner. Transmitter 234 is tuned to the resonant frequency corresponding to all three ports 240, 242 and 244 being open. Accordingly, when all three ports are open the output signal provided by receiver 236 will exceed an electrically set threshold level. However, when any or all of the three ports are closed the output signal provided by receiver 236 will be below the threshold. Thus, the device 230 functions as a logical NOR gate. While the acoustic logic device 230 has been illustrated in a form including three ports, it can be in a form including a greater number of a ports, in which case it simply is tuned to all of the ports being open.

Figure 10:
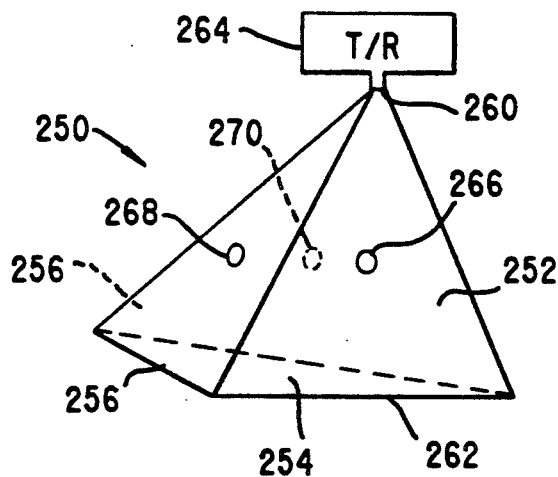
FIG. 10 is a diagrammatic view of a three port acoustic logic device according to the present invention which functions as an EXCLUSIVE OR gate.

FIG. 10 illustrates an acoustic logic device 250 according to the present invention which includes three ports and functions as an EXCLUSIVE OR gate. In particular, device 250 includes a non-planar port arrangement and a resonant chamber 252 defined by a pyramidal shaped structure having three walls 254, 256 and 258 meeting at one end in an apex 260 and joined at the opposite and by a base 262 thereby defining resonant chamber 252 in the interior thereof. A transmitter-receiver pair 264 is located at apex 260 and is in communication with resonant chamber 252. Three ports 266, 268 and 270 are provided, one on each of the walls 254, 256 and 258, respectively, in a non-planar arrangement as shown in FIG. 10.

The acoustic logic device 250 operates in the following manner. If one of the ports is closed, there will be a particular resonant frequency of chamber 252 and if two of the ports are closed there will be a different resonant frequency for the chamber. The transmitter of pair 264 is tuned for one of the ports being closed. Accordingly, when one of the ports is closed the amplitude of the output signal provided by the receiver of pair 264 will exceed the electrically set threshold level resulting in a logical one output. However, when none of the ports is closed or when more than one of the ports is closed, the receiver output will be below the threshold level resulting in a logical zero. Thus, the device 250 functions as a logical EXCLUSIVE OR gate. While the acoustic logic device 250 has been illustrated in a form including three ports, it can be in a form including a greater number of ports, in which case it simply is tuned to one of the parts being closed.

Figure 11:
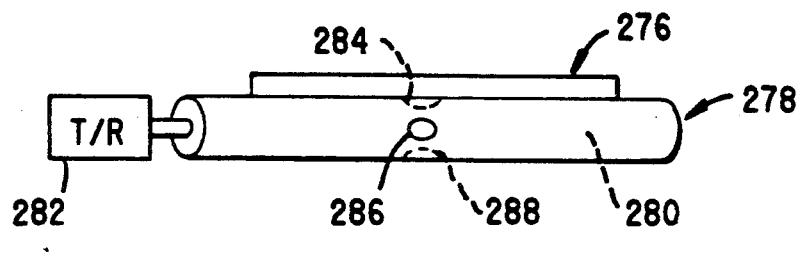
FIG. 11 is a diagrammatic view of a web sensor utilizing the device of FIG. 10.

One exemplary use of the foregoing three port acoustic logic device is in sensing the proper position of a web 276 on the upper surface of a roller 278 shown in FIG. 11. The hollow interior 280 of roller 278 defines a resonant chamber and is closed at one end and provided with a transmitter-receiver pair 282 at the opposite end thereof. A plurality of openings, the three designated 284, 286 and 288 in FIG. 11, are provided circumferentially around the mid-portion of roller 278 defining a plurality of ports in communication with resonant chamber 280. The transmitter of pair 282 is tuned to one of the ports being closed. FIG. 11 illustrates proper contact between web 276 and roller 278 thereby closing only one port with the result that the receiver of pair 282 provides a logical one output signal. If no web is present so that no ports are closed, or if the web were to break and hang up on roller 278 closing more than one port, this would be indicated by the receiver providing a logical zero output signal.

Figure 12:
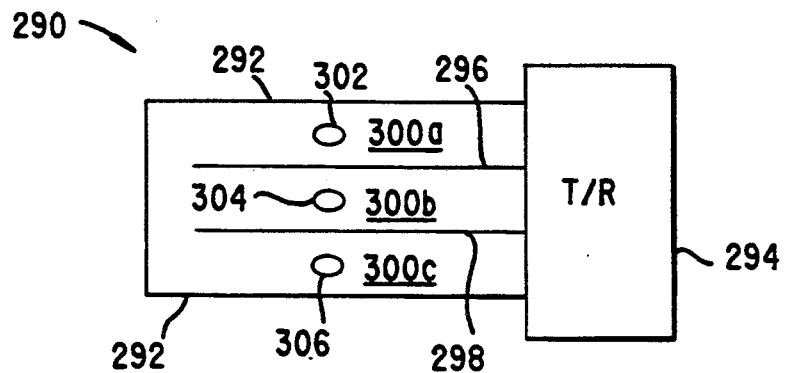
FIG. 12 is a diagrammatic view of a three part acoustic logic device according to the present invention which functions as an OR gate.

FIG. 12 illustrates an acoustic logic device 290 according to the present invention which includes three ports and functions as an OR gate. Device 290 includes a resonant chamber defined within a hollow rectangular structure 292 closed at one end and in communication with a transmitter-receiver pair 294 at the opposite end thereof. A pair of internal walls 296, 298 are provided to define three resonant chamber portions 300a, 300b and 300c. Walls 296, 298 terminate inwardly at the end of structure 292 so that the three resonant chamber portions are in communication adjacent that end. Three ports 302, 304 and 306 are provided in a wall of structure 292 so as to be in communication with respective ones of the resonant chamber portions 300a, 300b and 300c as shown in FIG. 12. The transmitter of pair 294 is tuned to the resonant frequency corresponding to one of the ports being closed and to the resonant frequency corresponding to all of the ports being closed. This mode of operation involves the superposition of two input frequencies.

Accordingly, when any one of the ports 302, 304 and 306 is closed, or when all three ports are closed, the output signal provided by the receiver of pair 294 will exceed the electrically set threshold level resulting in a logical one output. However, when all three ports are open the receiver output will be below the electrically set threshold level resulting in a logical zero. Thus, the device 290 functions as a logical OR gate. While the acoustic logic device 290 has been illustrated in a form including three ports, it can be in a form including a greater number of ports, in which case it simply is tuned to one of the ports being closed and all of the ports being closed.

Figure 13:
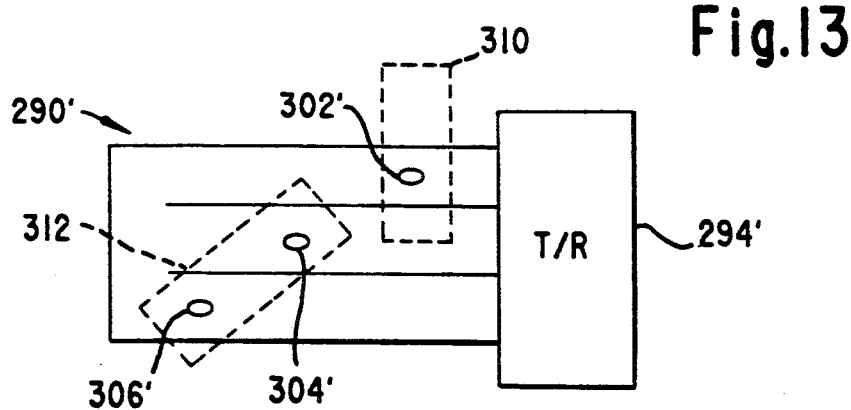
FIG. 13 is a diagrammatic view of an article senor utilizing the device of FIG. 12.

One illustrative use of the foregoing device is in sensing the presence of improperly oriented articles moving along a surface such as a conveyor belt. Device 290' shown in FIG. 13 would be located relative to the surface such that a properly oriented article such as 310 will close only one of the sensing ports, i e. port 302'. The receiver of pair 294 therefore will provide a logical one output signal. An improperly oriented article such as 312 travelling along the surface will close two sensing ports, i.e., ports 304' and 306' whereupon the receiver of pair 294 provides a logical zero output signal. The sensing ports 302', 304' and 306' are in staggered relation and laterally separated by a distance determined by two conditions. First, the distance is greater than the width of the article. Second, the distance is set such that an improperly oriented article will close two ports as it moves along the surface.

Figure 14:
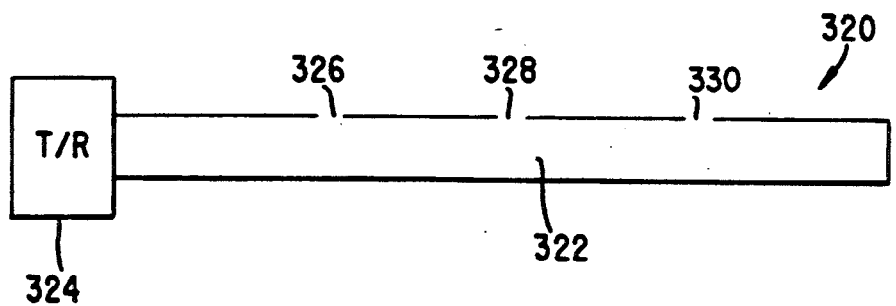
FIG. 14 is a diagrammatic view of a three port acoustic logic device according to the present invention which functions as a NAND gate.

FIG. 14 illustrates an acoustic logic device 320 according to the present invention which includes three ports and functions as a NAND gate. Device 320 includes a resonant chamber 322 closed at one end and provided with a transmitter-receiver pair 324 at the other end. Three ports 326, 328 and 330 are provided in spaced relation along the length of chamber 322. The transmitter of pair 324 feeds a signal which is a superposition of three resonant frequencies corresponding to all of the ports being open, two of the ports being open or one of the ports being open. When all of the ports are closed, no resonant frequency will be received and the threshold level will not be exceeded. Accordingly, the receiver will provide a logical zero output. Alternatively, the transmitter of pair 324 can be tuned to the resonant frequency corresponding to all of the ports being closed. The receiver threshold circuit is set such that it produces a logical zero. Thus, the device 320 functions as a logical NAND gate. While the acoustic logic device 320 has been illustrated in a form including three ports, it can be in a form including a greater number of ports, in which case it simply is tuned to all of the ports being closed providing a logical zero.

It is therefore apparent that the present invention accomplishes its intended objects. There is provided a new and improved logic device employing acoustic means, in particular a digital logic device which utilizes the two state operation of acoustic sensing devices. The acoustic logic device according to the present invention is capable of implementing a variety of logic devices such as inverters and AND, NAND, OR and NOR gates, and the device of the present invention is relatively simple in structure and operation and is efficient and effective in operation. By having the passages and ports of relatively small cross-sectional size or area, very little air pressure, i.e. energy, is required in operation of the device.

While embodiments of the present invention have been described in detail, that is for the purpose of illustration, not limitation.

What is claimed is:

1. An acoustic logic device comprising a resonant chamber, at least one port establishing a first resonant frequency in said chamber when said port is closed and establishing a second resonant frequency in said chamber when said port is open, transmitter means operatively associated with said chamber and tuned to either of said first or second resonant frequencies, and receiver means operatively associated with said chamber and responsive to acoustic signals developed therein and providing a digital logic output.

2. A logic device according to claim 1, wherein said port is closed and said transmitter means is tuned to said second resonant frequency so that said device functions as an inverter.

3. A logic device according to claim 1, wherein said port is open and said transmitter means is tuned to said first resonant frequency so that said device functions as an inverter.

4. An acoustic logic device comprising a resonant chamber, at least two ports establishing a plurality of resonant frequencies in said chamber depending upon whether said ports are all open, all closed or some open and the rest closed, receiver means operatively associated with said chamber and responsive to acoustic signals developed therein and providing a digital logic output and transmitter means operatively associated with said chamber and tuned to one of said resonant frequencies thereby determining the type of logic device.

5. A logic device according to claim 4, including two of said ports wherein said transmitter means is tuned to the resonant frequency corresponding to both of said ports being closed so that said device functions as an AND gate.

6. A logic device according to claim 4, including two of said ports wherein said transmitter means is tuned to resonant frequency corresponding to both of said ports being open so that said device functions as a NOR gate.

7. A logic device according to claim 4, including two of said ports wherein said transmitter means is tuned to the resonant frequency corresponding to one of said ports being open and the other of said ports being closed so that said device functions as an EXCLUSIVE OR gate.

8. A logic device according to claim 4, wherein said transmitting means operates in a mode involving the superposition of two input frequencies and wherein said transmitting means is tuned to one resonant frequency corresponding to one of said ports being closed and the other of said ports being open and to a second resonant frequency corresponding to both of said ports being closed so that said device functions as an OR gate.

9. A logic device according to claim 4, wherein said transmitting means operates in a mode involving the superposition of two input frequencies and wherein said transmitting means is tuned to one resonant frequency corresponding to one of said ports being closed and the other of said ports being open and to a second resonant frequency corresponding to both of said ports being open so that said device functions as a NAND gate.

10. A logic device according to claim 1, in combination with apparatus for sensing the presence or absence of an object, wherein said port is adapted to be in operative association with the object so that the presence of the object is indicated by the object closing said ports.

11. A logic device according to claim 4, in combination with apparatus for sensing the presence or absence of objects, wherein each of said ports is adapted to be in operative association with an object so that the presence of the object is indicated by the object closing the port.

12. In apparatus for performing an operation on a pair of webs of material travelling through said apparatus, sensing apparatus for indicating the presence of said webs comprising:
 a) an acoustic logic device comprising a body having a resonant chamber defied therein, a pair of ports in said body and in communication with said chamber for establishing a plurality of resonant frequencies in said chamber depending upon whether said ports are both open, both closed or one open and one closed, receiver means operatively associated with said chamber and responsive to acoustic signals developed therein and providing a digital logic output, and transmitter means operatively associated with said chamber and tuned to the one of said resonant frequencies corresponding to both of said ports being closed; and
 b) means for directing each of said webs into operative association with one of said ports so that the presence of said webs is indicated by the webs closing said ports.

13. An acoustic logic device comprising a resonant chamber, at least three ports establishing a plurality of resonant frequencies in said chamber depending upon whether said ports are all open, all closed, one closed and the rest open or one open and the rest closed, receiver means operatively associated with said chamber and responsive to acoustic signals developed therein and providing a digital logic output, and transmitter means operatively associated with said chamber and tuned to at least one of said resonant frequencies thereby determining the type of logic 14. A logic device according to claim 13, wherein said transmitter means is tuned to the resonant frequency corresponding to all of said ports being closed so that said device functions as an AND gate.

15. A logic device according to claim 14, in combination with apparatus for sensing lateral drift of a web of known width as it travels along a path, the outermost ones of said ports being operatively associated with the edges of said web so that both of said ports are covered by said web when in proper lateral position.

16. A logic device according to claim 13, wherein said transmitter means is tuned to the resonant frequency corresponding to all of said ports being open so that said device functions as a NOR gate.

17. A logic device according to claim 13, wherein said transmitter means is tuned to the resonant frequency corresponding to one of said ports being closed so that said device functions as an EXCLUSIVE OR gate.

18. A logic device according to claim 17, in combination with apparatus for sensing the proper position of a web on a roller, said resonant chamber being defined within said roller and said ports being provided in spaced relation circumferentially around said roller.

19. A logic device according to claim 13, wherein said transmitting means operates in a mode involving the superposition of two input frequencies and wherein said transmitting means is tuned to one resonant frequency corresponding to any one of the ports being closed and and to a second resonant frequency corresponding to all of the ports being closed so that said device functions as an OR gate.

20. A logic device according to claim 19, in combination with apparatus for sensing the presence of improperly oriented articles moving along a surface, said ports being in laterally spaced relation relative to the direction of travel of said articles along the surface such that a properly oriented article will close only one of said ports and an improperly oriented article will close two of said ports.

21. A logic device according to claim 13, wherein said transmitting means operates in a mode involving the superposition of three input frequencies and wherein said transmitting means is tuned to one resonant frequency corresponding to all of said ports being, and to a second resonant frequency corresponding to two of said ports being open an. to a third resonant frequency corresponding to one of said ports being open so that said device functions as a NAND gate.

* * * * *